Figure 1:
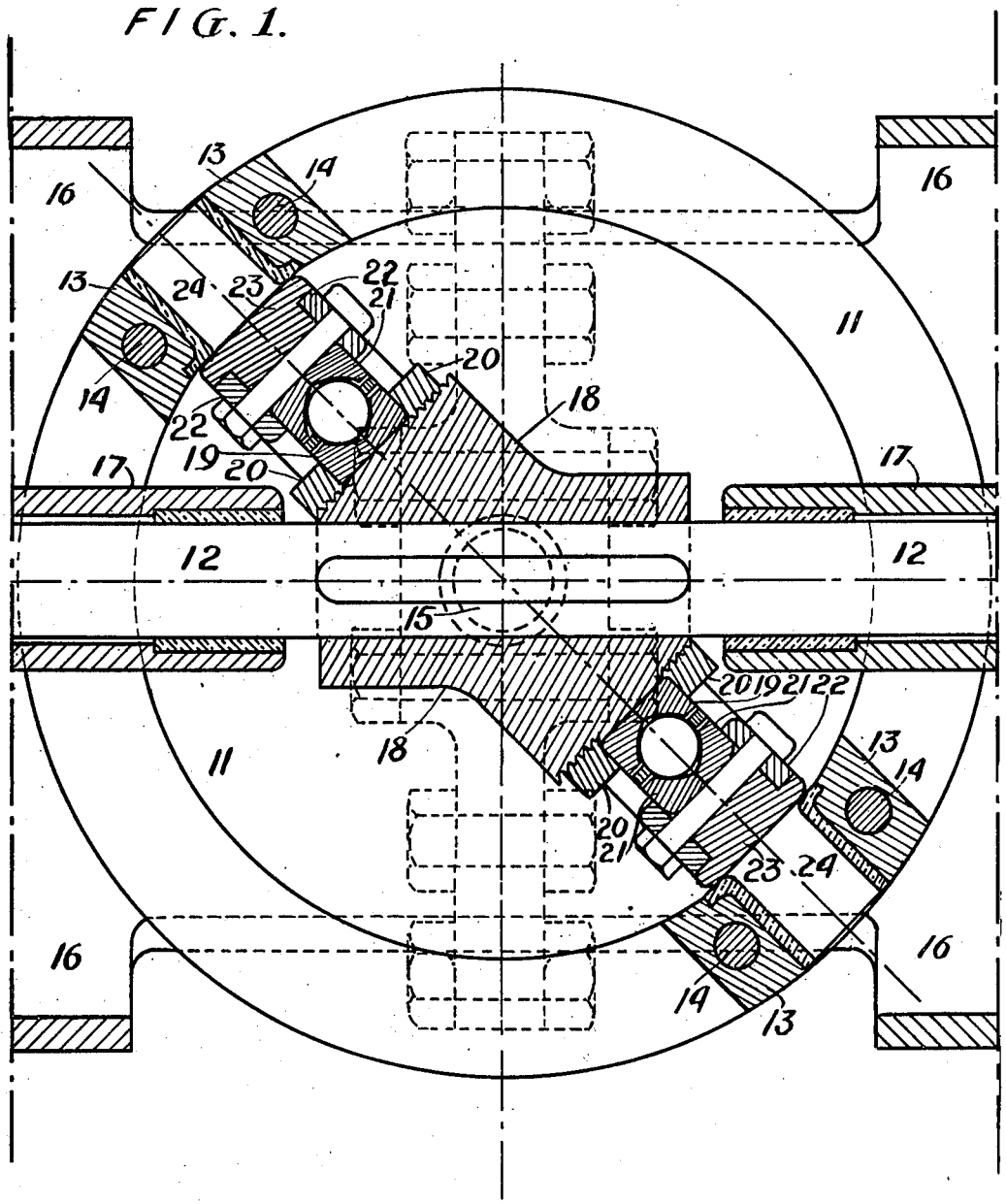

W. HUNT.
ROTARY MECHANISM FOR THE TRANSMISSION OF POWER AT VARYING SPEEDS.
APPLICATION FILED NOV. 22, 1916.

1,298,506.

Patented Mar. 25, 1919.
4 SHEETS—SHEET 1.

INVENTOR
WILFRED HUNT
BY Hmm and Hmm
Attorneys

W. HUNT.
ROTARY MECHANISM FOR THE TRANSMISSION OF POWER AT VARYING SPEEDS.
APPLICATION FILED NOV. 22, 1916.

1,298,506.

Patented Mar. 25, 1919.

4 SHEETS—SHEET 4.

INVENTOR
WILFRED HUNT
BY
ATTORNEYS

UNITED STATES PATENT OFFICE.

WILFRED HUNT, OF GLASGOW, SCOTLAND.

ROTARY MECHANISM FOR THE TRANSMISSION OF POWER AT VARYING SPEEDS.

1,298,506. Specification of Letters Patent. Patented Mar. 25, 1919.

Application filed November 22, 1916. Serial No. 132,870.

*To all whom it may concern:*

Be it known that I, WILFRED HUNT, a subject of the King of Great Britain and Ireland, and a resident of Hillhead, Glasgow, Scotland, have invented certain new and useful Improvements in Rotary Mechanisms for the Transmission of Power at Varying Speeds, of which the following is the specification.

The invention relates to that type of power transmission mechanism which is described in the specification of my prior Patent No. 1,127,251, and although its subject-matter falls broadly within the scope of that patent it embraces details and additional matters not therein directly disclosed.

Perhaps the simplest explanation of the action of a mechanism based on the principles disclosed in the parent specification is that any relative motion between the primary and secondary members tends to change the state of rest or of motion relative or otherwise of the inertia member. The inertia member resists this tendency with a resistance immediately proportionate to the violence of the change imposed upon it. In other words, the inertia member is a floating fulcrum between the primary and the secondary members which transfers motion from one to the other, and in so transferring motion offers a fulcrum-resistance proportionate to the violence with which its state is changed by the reluctance of the secondary member to follow the primary member.

The motion of a unit of the inertia member is a to-and-fro oscillation in the complete cycle of which is firstly, a period of acceleration from a position of rest (relative or otherwise) to a certain maximum velocity, secondly, a period of retardation from that maximum velocity to rest (relative or otherwise) again, thirdly, a second period of acceleration during which the mass commences its return oscillation, and, fourthly, a period of retardation at the end of which the mass has reached the state in which the cycle commenced. As hereinafter explained, one inertia member may have given to it successive oscillations in two planes.

Analysis of this cycle shows that the inertia unit is taking power from the primary member only for its acceleration. Thus, there are in the cycle two power absorbing phases alternating with two phases during which power is not absorbed. If motion then is not to be transmitted in a series of jerks, it is necessary that there be a series of inertia units acting in successive phase. This necessity was set forth in the parent specification, and no claim is made to such an arrangement *per se*. herein, but the opportunity is taken to put what this means more clearly. And it simply means that in any system, while in operation, there should always be one inertia unit being accelerated. This may be considered as the first step to smooth running.

In the device shown and described in the parent specification, connecting-rod obliquity is present. Owing to this, the acceleration and retardation periods are not equal. Now, in dealing with what may be termed an intractable force such as inertia and one moreover which varies as the squares of the velocities involved, such an irregularity becomes marked. A second step toward complete smoothness of running and one which forms part of the subject-matter of this application, is the elimination of this irregularity of motion and the provision of a mechanism such that all four periods of the cycle of a unit are equal or substantially so.

For various reasons given in the parent specification, it was therein set forth that the axes of the inertia units should coincide with the coincident primary and secondary axes. When such is the case, oscillation of an inertia unit is in a sense relative, as at the same time that it is oscillating, it is rotating bodily on its axis. The result of this is that the forces developed by oscillation are to a certain extent modified by those of rotation, with the result that there is not exact equality in the power capacity of those parts of the cycle of oscillation in which oscillation is in the direction of rotation and those parts of the cycle in which oscillation is contrary to the direction of rotation—the power-capacity of the first mentioned parts being somewhat greater than that of the second mentioned. The result of this is that unless there is a large number of inertia units, there is a certain variation in torque. According to the present invention, the inertia units are arranged with their axes of oscillation otherwise than coincident with the axis of primary and secondary rotation.

To recapitulate; the present invention has for its objects firstly, to eliminate connecting-rod obliquity and similar causes of irregularity and to provide a mechanism in which the oscillation periods are as equal as may be, and secondly to provide a mechanism in which oscillation takes place about axes other than those of rotation, so avoiding interference of the forces of rotation with those of oscillation. The invention has further for its object to provide a form of mechanism exceedingly simple and in which all those desirable features hereinbefore referred to are embodied and in which there is a minimum of working parts easily and cheaply constructed, complete static and rotational balance is readily obtained, harmful interference of centrifugal force with the action of the apparatus is eliminated and bearing stresses due to it minimized, and a more regular turning moment obtained from each unit owing to the fact that there is an absence of confusion between the motions of rotation and oscillation.

In a mechanism such as is described and shown in the parent specification, connecting-rod obliquity may obviously be overcome by the introduction into the linkage interconnecting the primary, the secondary and the inertia members any of those devices which will give the geometrical effect of a connecting-rod of unlimited length— such for example as cross-slide devices or straight-line-motion links. These have been experimented with and give the effect desired, but they are complex and occupy much space relatively.

The inertia mass units set so that their oscillation is not coaxial with their bodily rotation might simply be on axes parallel with and eccentric to the axis of bodily rotation, but if so, their pivots would be subject to heavy centrifugal stresses. Or the inertia mass units might be reciprocated either radially or in axial direction instead of being oscillated about a point, but such arrangements also involve bearing stresses and complications—although all are within the broad scope of the first part of the present invention.

Therefore according to one manner of carrying out the invention, an inertia unit consists of a flywheel mass balanced about its axis of oscillation and having its axis of oscillation at an angle (for example at right angles) to and cutting the axis of rotation of the primary and the secondary members which may be considered as a casing and a shaft respectively. The casing member, the shaft member, and the flywheel mass, are so inflexibly interconnected, that relative rotation of the shaft and casing members causes oscillation of the mass, such oscillation being of constant amplitude but of periodicity varying with the difference in speed of the shaft and casing members. Or again, the mass of an inertia unit may be oscillated in two planes. The mechanism interconnecting shaft member, casing member and mass members, may be of any convenient form or type.

According to a simple illustrative example, the mass unit consists of a pair of flywheels straddling the shaft, rigidly interconnected with one another, and pivoted in the case. On the shaft, and so that its axis cuts the point of intersection of the axis of the shaft and of the flywheels, is a "swash-plate" or rather a swash-block— that is to say a disk or block the axis of which is inclined to the axis of the shaft. This swash-plate engages a gimbal ring having diametrally opposed trunnion pins engaging blocks fixed between the flywheels.

According to a second manner of carrying out the invention, the inertia mass is so disposed and interconnected with the shaft and casing members that it is oscillated conjointly in two planes and about axes at right angles to and cutting one another in the axis of rotation and inclined thereto.

In a simple illustrative example of this manner of carrying out the invention, the inertia mass consists of a heavy ring directly mounted upon a swash-block. At diametrally opposite points this ring is pivoted on a gimbal ring pivoted in turn and at right angles in the casing. The axes of pivoting of the inertia ring upon the gimbal ring and of the gimbal ring in the casing cut one another in the axis of rotation. Looking at this device with the pivots of the inertia ring vertical, it will be seen that the swash-block imparts to that ring, firstly, an oscillation in vertical plane, and secondly a like oscillation in horizontal plane, the two oscillations producing conjointly a "wabble" about axes which cut each other and the axis of rotation, but which are at a constantly varying angle to each other. Thus what may be termed the top and bottom quarters of the inertia ring form one flywheel unit, while the intermediate horizontally opposite quarters form a second flywheel unit.

On consideration, it will be seen that while the difference in the action of these two forms of machine is considerable, the difference in construction is slight,—in the second example, it is merely the gimbal ring of the first example which is made heavy, while the heavy flywheels of the first example become the light outer gimbal ring of the second example.

If anything really approaching smooth running is desired, two units of either form must be used. Even with two units, there occur with their corresponding shocks instantaneous periods at which no effective action takes place. Therefore three units should be used, and they should be equidistantly disposed, that is, set at either 60° or 120° to one another. More than three units equidistantly disposed may of course be used.

The essence of the invention obviously lies in the manner in which the inertia members are oscillated, and the manner in which they are disposed relatively to the axis of rotation, and as has already been said, any means—so long as they be inflexible in the sense set forth—may be provided for their interconnection with the shaft and casing members. "Shaft" and "casing" members are only used as terms of convenience, and cover any devices performing the functions these parts have. Likewise swash plate or block is held to cover equivalents thereof such as Z cranks or cams.

Figure 2:
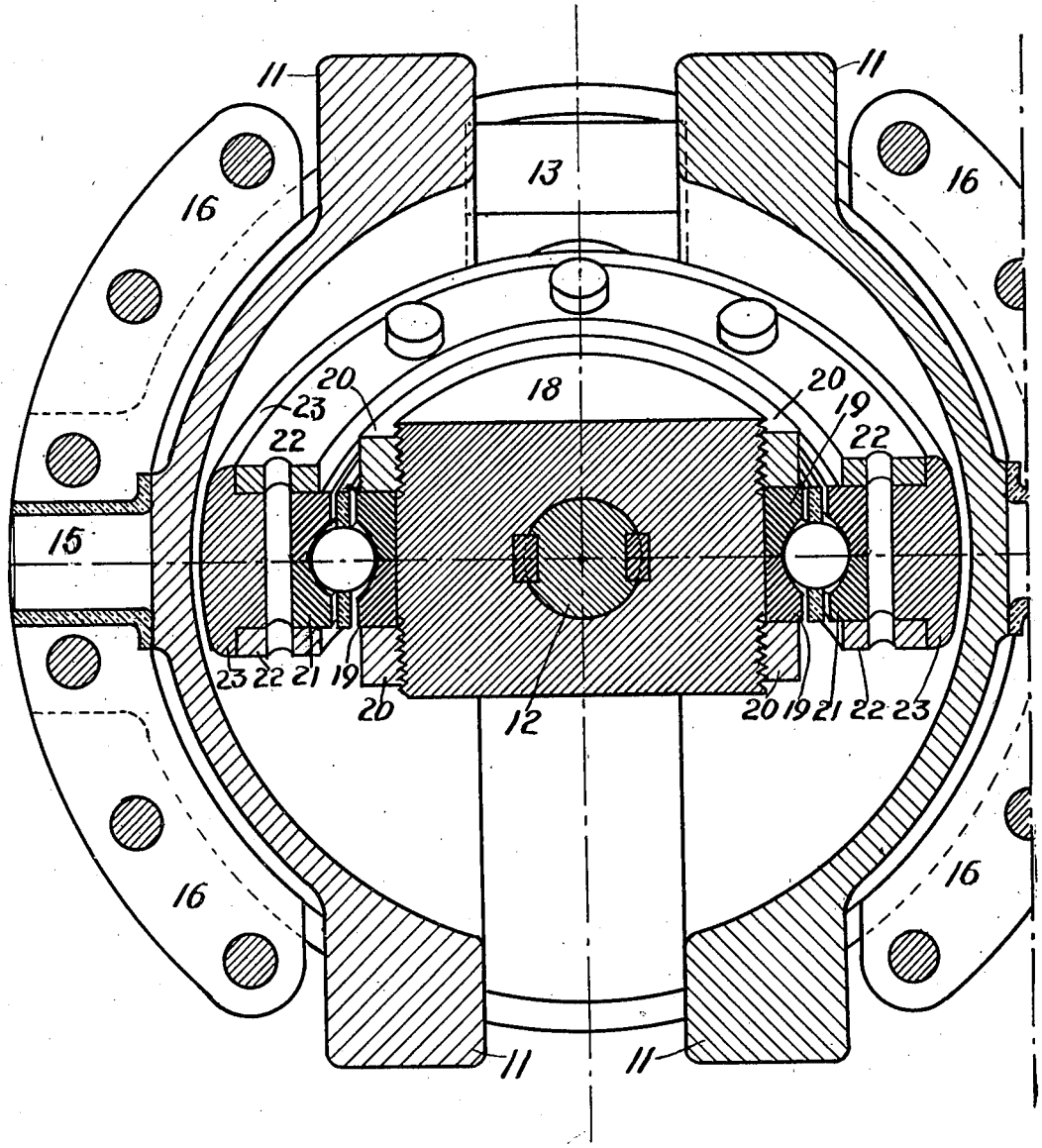
Figure 3:
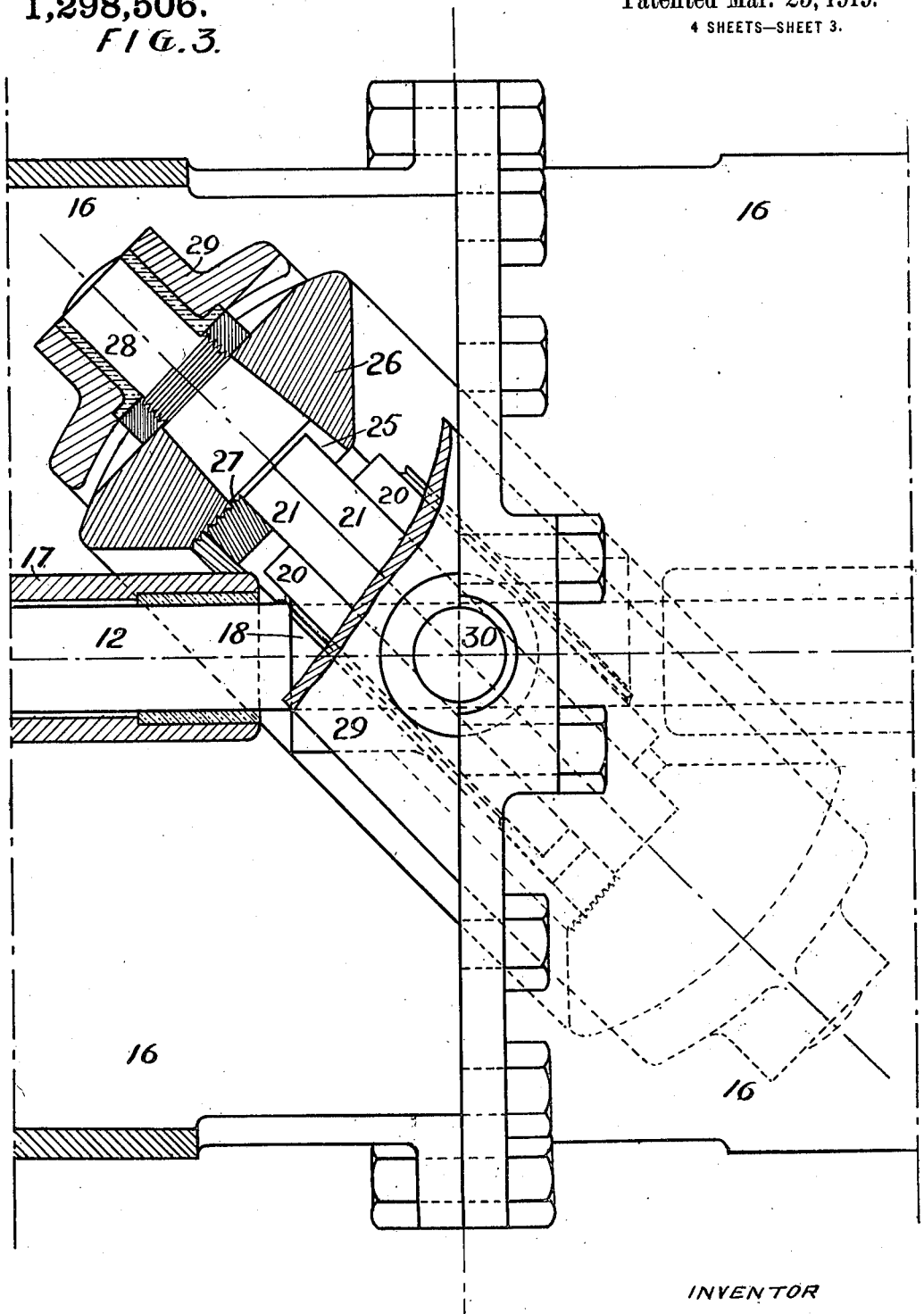
Figure 4:
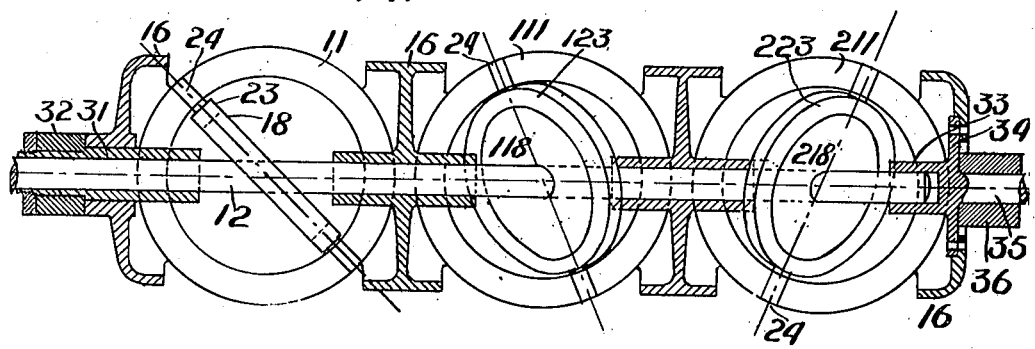
Figure 5:
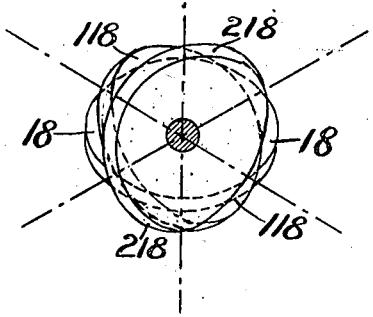
Figure 6:
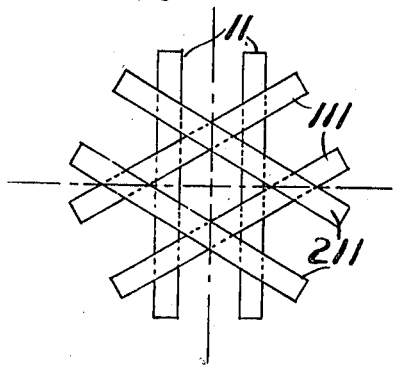

There are hereunto appended four sheets of explanatory drawings, Figure 1 Sheet 1 showing in longitudinal sectional elevation and Fig. 2 Sheet 2 showing in transverse sectional elevation an example of a unit according to the manner of carrying out the invention firstly set forth, Fig. 3, Sheet 3, showing in longitudinal sectional elevation an example of a unit according to the manner of carrying out the invention secondly set forth, while Figs. 4, 5 and 6, Sheet 4, show in diagrammatic form examples of the setting of a series of units to form a complete machine.

In the illustrative example shown in Figs. 1 and 2, the mass unit consists of a pair of flywheels 11 straddling the shaft 12 and rigidly connected together by blocks 13 recessed into their faces and secured by bolts 14. On the flywheels are trunnion pins 15 which engage bearings formed for them between the abutting parts of a casing member 16 which carries bearings 17 for the shaft 12. On the shaft 12 is keyed a block 18 forming the "swash-block". It has on it a cylindrical surface the axis of which is inclined (at 45°) to the axis of the shaft and which forms the seating for the inner races 19 of a four-point ball-bearing, which inner races are secured in place by rings 20 screwed upon the cylindrical part of the block 18 and locked by any convenient means. The outer races 21 of the ball bearing are secured by rings 22 in a gimbal ring 23. This gimbal ring has formed on it trunnion pins 24 which engage bearings formed in the blocks 13 connecting the flywheels 11.

The illustrative example shown in Fig. 3, which is according to the second manner of carrying out the invention, differs but little structurally from that just described. The shaft 12 with its block 18 and ball bearing remain the same, and the casing member 16 remains substantially the same. The outer races 21 of the ball bearings are secured between a lip 25 formed on a heavy ring 26 (which forms the flywheel mass) and a ring 27 screwed into the ring 26 and locked in any convenient manner. The heavy ring 26 carries trunnion pins 28 which engage bearings in a gimbal ring 29 which in turn has on it trunnion pins 30 which engage bearings formed between the parts of the casing member 16.

The diagrams of Figs. 4 and 5 illustrate the arrangement of three units of the first type. It will be seen that the shaft 12 passes from end to end. At its ingoing end it is carried in a sleeve 31 fixed in a stationary bracket 32. At the far end it takes bearing in a sleeve 33 formed together with a coupling flange 34 on a shaft 35 carried in a stationary bearing 36. The casing member 16, made in four parts bolted together at the axles of the flywheels, is carried on this flange 34 and at the other end takes bearing on the sleeve 31. Diagrammatically indicated are three swash blocks 18, 118, 218 on the shaft 12 engaging three gimbal rings 23, 123, 223, the trunnion pins 24 of which engage three pairs of flywheels 11, 111, 211, pivoted in the casing member 16.

The swash blocks 18, 118, 218 are set as shown also in end views in Fig. 5 at 60° to one another—as the swings of the flywheels are equal and opposite they might equally well be at 120° to one another—and the succession of the phases of the three units is very clearly to be seen in Fig. 4. Instead of the swash blocks being set at successive angles to one another, they may be in line, i. e. parallel, and the flywheels may be so set as diagrammatically indicated in Fig. 6 which is an end view.

The arrangement of the parts with a series of units is the same in the case of the second manner of carrying out the invention an example of which is shown in Fig. 3.

Either the casing member 16 or the shaft member 12 may be the primary in the first form, but in the second form the shaft must be primary.

The examples shown are inherently in static balance. Rotatory balance may easily be arrived at in the case of the example shown in Figs. 1 and 2, firstly by applying to the swash block radial balance weights so disposed and of such moment that they balance the out-of-balance masses of the swash block, gimbal ring and allied parts, secondly by balancing on the flywheels the unbalanced masses of the blocks 13 with their pins 24—that is to say disposing the total weights of the flywheels with these parts equally around the axes of the wheels. Similarly, rotational balance may be secured in the example shown in Fig. 3 by applying similar radial balance weights to the swash block sufficient to balance the heavy ring 26, the ball bearings and allied parts, while the gimbal ring 29 and pins 28 are balanced by lateral extensions near its case pivots 30.

In the claims the term "swash-plate device" covers a swash plate or block or its equivalents such as a Z crank.

What I claim is:—

1. In power transmission mechanism, a primary member, a secondary member, and inertia masses, in combination with means so inflexibly interconnecting the inertia masses between the primary and secondary members that the said masses are not only oscillated in accordance with the difference in speed between the primary and secondary members, but also given substantially even oscillating motion so that their phases of acceleration are substantially equal as are also their phases of retardation and the power-capacity of any given phase is equal to the power-capacity of any other like phase.

2. In power transmission mechanism, a primary member, a secondary member, and an inertia mass substantially balanced about the axis of bodily rotation, said inertia mass being interconnected with freedom of oscillation between the primary and secondary members upon an axis at an angle to and cutting the axis of bodily rotation.

3. In power transmission mechanism, a primary member, a secondary member, and an inertia mass substantially balanced about the axis of bodily rotation, said inertia mass being interconnected with freedom of oscillation between the primary and secondary members upon an axis at right angles to and cutting the axis of bodily rotation.

4. In power transmission mechanism, a primary member, a secondary member, and an inertia mass interconnected between the primary and secondary members, the interconnecting means comprising a swash plate device on one of said members and means engaging said inertia mass with said swash plate device.

5. In power transmission mechanism, a primary member, a secondary member, and an inertia mass interconnected between the primary and secondary members, the interconnecting means comprising a swash plate device on one of said members and means engaging said inertia mass with said swash plate device, together with means connecting said inertia mass with the other member.

6. In power transmission mechanism, a primary member, a secondary member, and an inertia mass interconnected between the same, the interconnecting means comprising a swash plate device on one of said members, a gimbal ring engaging the swash plate device and an element interposed between said gimbal ring and the other member.

7. In power transmission mechanism, a primary member, a secondary member, and an inertia mass interconnected between the same, the interconnecting means comprising a swash plate device on one of said members, a gimbal ring engaging the swash plate device, an engagement between the gimbal ring and the inertia mass, and an engagement between the inertia mass and the other member.

8. In power transmission mechanism, a primary member, a secondary member, and an inertia mass interconnected between the same, the interconnecting means comprising a swash plate device on one member, a ring-like mass engaging the swash plate device and means interconnecting said mass with the other member.

9. In power transmission mechanism, a primary member, a secondary member, and an inertia mass balanced about the axis of bodily rotation, and means interconnecting said mass between the primary and secondary members on an axis at an angle to and cutting the axis of bodily rotation, said interconnecting means comprising a swash plate device on one member, means engaging said swash plate device and a pivoted connection between said means and the other member.

10. In power transmission mechanism, a primary member, a secondary member, and an inertia mass balanced about the axis of bodily rotation, and means interconnecting said mass between the primary and secondary members on an axis at an angle to and cutting the axis of bodily rotation, said interconnecting means comprising a swash plate device on one of said members, a gimbal ring engaging the swash plate device, and means interconnecting said gimbal ring with the inertia mass and the other member.

11. In power transmission mechanism, a primary member, a secondary member, and an inertia mass balanced about the axis of bodily rotation, and means interconnecting said mass between the primary and secondary members on an axis at an angle to and cutting the axis of bodily rotation, said interconnecting means comprising a swash plate device on one of the members, a ring-like mass engaging said swash plate device, and means interconnecting said mass and the other member.

12. In power transmission mechanism, a primary member, a secondary member, and an inertia mass interconnected between the primary and secondary members and oscillating upon an axis at an angle to and cutting the axis of bodily rotation, said inertia mass being substantially balanced about the axis of bodily rotation and comprising a pair of flywheels rigidly interconnected and straddling the axis of bodily rotation and having their axes of oscillation at right angles to and cutting said axis.

13. In power transmission mechanism, a primary member, a secondary member, and an inertia mass interconnected between the primary and secondary members and oscillating upon an axis at an angle to and cutting the axis of bodily rotation, said inertia mass being substantially balanced about the axis of bodily rotation and comprising a pair of flywheels rigidly interconnected and straddling the axis of bodily rotation and having their axes of oscillation at right angles to and cutting said axis, said interconnecting means comprising a swash plate device on one of said members, and means for imparting oscillatory motion therefrom to the inertia mass on relative variation in speed between the primary and secondary members.

14. In power transmission mechanism, a primary member, a secondary member, and an inertia mass interconnected between the same, said mass being substantially balanced about the axis of bodily rotation and oscillating upon an axis at an angle to and cutting said axis, said inertia mass having the form of a pair of flywheels rigidly interconnected and straddling the axis of bodily rotation but having their axes of oscillation at right angles to and cutting the axis of bodily rotation, together with a swash plate device on one of said members, a gimbal ring engaged by the swash plate device, trunnion pins on the gimbal ring engaging the pair of rigidly interconnected flywheels and trunnions on the flywheels interconnecting the same with the second member.

15. In power transmission mechanism, a primary member, a coaxial secondary member, and an interposed inertia mass oscillating upon an axis at right angles to and cutting the axis common to the primary and secondary members, and means on one of said members for imparting to said inertia mass an oscillatory movement upon its axis on a variation of the relative speeds of the primary and secondary members.

16. In power transmission mechanism, a primary member, a coaxial secondary member, and an interposed inertia mass oscillating upon an axis at right angles to and cutting the axis common to the primary and secondary members, and means on one of said members for imparting to said inertia mass an oscillatory movement upon its axis on a variation of the relative speeds of the primary and secondary members, said means comprising a swash plate device on one of said members, the plane of said swash plate device cutting the axis of oscillation of said inertia mass and being operatively engaged with said mass.

17. In power transmission mechanism, a primary member, a coaxial secondary member, and an inertia mass interconnected between the same on an axis at right angles to and cutting the common axis of said primary and secondary members, together with a swash plate device mounted on one of said members in a plane intersecting the axis of the inertia mass, together with an operating connection with freedom of relative rotation and displacement between said swash plate device and inertia mass whereby on variation of relative speed between the primary and secondary members, oscillation is imparted to the inertia mass.

In testimony whereof I have signed my name to this specification in the presence of two subscribing witnesses.

WILFRED HUNT.

Witnesses:
 DAVID FERGUSON,
 JAMES EAGLESOM.